United States Patent
Lee (10) Patent No.: US 7,287,028 B2
(45) Date of Patent: Oct. 23, 2007

(54) TRAVERSAL PATTERN MINING APPARATUS AND METHOD THEREOF

(75) Inventor: Chang-Hung Lee, Yunlin (TW)

(73) Assignee: Benq Corporation, Taoyuan (TW)

( * ) Notice: Subject to any disclaimer, the term of this patent is extended or adjusted under 35 U.S.C. 154(b) by 408 days.

(21) Appl. No.: 10/973,737

(22) Filed: Oct. 26, 2004

(65) Prior Publication Data

US 2005/0097117 A1    May 5, 2005

(30) Foreign Application Priority Data

Oct. 30, 2003    (TW) .............................. 92130199 A (51) Int. Cl.
*G06F 17/30*    (2006.01)
*G06F 7/00*    (2006.01)
(52) U.S. Cl. .................. 707/6; 707/10; 707/3; 707/100
(58) Field of Classification Search ...................... None
See application file for complete search history.

(56) References Cited

U.S. PATENT DOCUMENTS 5,668,988 A * 9/1997 Chen et al. .................. 707/101
6,138,117 A * 10/2000 Bayardo .......................... 707/6
6,473,757 B1 * 10/2002 Garofalakis et al. ........... 707/6

* cited by examiner

*Primary Examiner*—Christian Chace
*Assistant Examiner*—Aleksandr Kerzhner
(74) *Attorney, Agent, or Firm*—Thomas, Kayden, Horstemeyer & Risley (57) ABSTRACT

A system for traversal pattern mining. A storage device stores multiple web log records individually comprising multiple ordered web objects, and multiple minimum support records individually corresponding to the web object and comprising a min_sup value corresponding to the position of the web object. A traversal pattern mining program inserts the web objects with occurrence is exceeding or equaling the corresponding min_sup value into a first large reference sequence set ($L_1$), generates multiple first candidate reference sequences, inserts the first candidate reference sequences with occurrence exceeding or equaling the minimized min_sup value of the self-contained web objects into a second large reference sequence set ($L_2$), and generates a traversal pattern set by merging the $L_1$ and the $L_2$.

12 Claims, 10 Drawing Sheets

| Log Number | Traversal Path |
|---|---|
| 1 | < A , B , C , D > |
| 2 | < C , A , B , D > |
| 3 | < A , C , B , G , H > |
| 4 | < C , A , D > |
| 5 | < A , D > |
| 6 | < A , B , E , G > |
| 7 | < A , D , B , G , H > |
| 8 | < C , B , F > |
| 9 | < A , F > |
| 10 | < A , B , G , H > |

| Page(p) | min_sup(p) | |
|---|---|---|
| A | 8 | —51 |
| C | 8 | —52 |
| B | 6 | —53 |
| D | 3 | —54 |
| E | 1 | —55 |
| F | 1 | —56 |
| G | 1 | —57 |
| H | 1 | —58 |

| C₂ | count | C₂ | count | C₂ | count |
|---|---|---|---|---|---|
| {EF} | 0 | {HF} | 0 | {GC} | 0 |
| {FE} | 0 | {FD} | 0 | {CG} | 1 |
| {EG} | 1 | {DF} | 0 | {HD} | 0 |
| {GE} | 0 | {FB} | 0 | {DH} | 1 |
| {EH} | 0 | {BF} | 1 | {HB} | 0 |
| {HE} | 0 | {FA} | 0 | {BH} | 3 |
| {ED} | 0 | {AF} | 1 | {HA} | 0 |
| {DE} | 0 | {FC} | 0 | {AH} | 3 |
| {EB} | 0 | {CF} | 1 | {HC} | 0 |
| {BE} | 1 | {GH} | 3 | {CH} | 1 |
| {EA} | 0 | {HG} | 0 | {DB} | 1 |
| {AE} | 1 | {GD} | 0 | {BD} | 2 |
| {BC} | 0 | {DG} | 1 | {DA} | 0 |
| {CE} | 0 | {GB} | 0 | {AD} | 5 |
| {FG} | 0 | {BG} | 4 | {DC} | 0 |
| {GF} | 0 | {GA} | 0 | {CD} | 3 |
| {FH} | 0 | {AG} | 4 | | |

(d)

⇩ Filter

| L₂ | count |
|---|---|
| {BE} | 1 |
| {EG} | 1 |
| {BF} | 1 |
| {AF} | 1 |
| {GH} | 3 |
| {BG} | 3 |
| {AD} | 3 |

FIG. 9 ns are tho

TRAVERSAL PATTERN MINING APPARATUS AND METHOD THEREOF

BACKGROUND OF THE INVENTION

1. Field of the Invention

The present invention relates to web mining technology, and more particularly, to a method and apparatus of traversal pattern mining with reference to predefined minimum support value corresponding to web object position.

2. Description of the Related Art

With the rapid expansion of the World Wide Web (WWW), web data mining has recently become increasingly important. An important issue in web data mining is traversal pattern mining used to decide upcoming likely web page requests based on significant statistical correlations. Web log data is collected by web servers, containing information about user behavior on a site (e.g., sequences of URLs requested by different clients bearing different IP address.). The analysis of these large volumes of log data requires employment of data mining methods. According to the definition of association mining rules, mined patterns are those access sequences of frequent occurrence. If a sequence appears frequently enough, the sequence indicates a frequent traversal pattern. Understanding user traversal patterns not only helps improve the Web site design, such as providing efficient access between highly correlated objects, better authoring design for pages, and the like, but also lead to better marketing decisions, such as advertisement placement, more accurate customer classification and behavior analysis, and the like.

Although conventional methods described are feasible for the mining of frequent traversal patterns from a log file, several problems remain. Specifically, conventional methods of traversal pattern mining are based on the model of a uniform support threshold to determine frequent traversal patterns without considering such important factors as the length of the pattern and the positions of web pages. As a result, a low support threshold leads to generation of unimportant patterns while a high support threshold may cause important patterns with lower support to be ignored.

In view of these limitations, a need exists for an apparatus and method of traversal pattern mining, with reduced process time and improved usability of results.

SUMMARY OF THE INVENTION

It is therefore an object of the present invention to provide an apparatus and method of traversal pattern mining, with reduced process time and improved usability of results. To achieve the above object, the present invention provides a system and method of traversal pattern mining that considers the length of the pattern and the positions of web pages.

According to the invention, the apparatus includes a display device, a central processing unit (CPU), a memory, a storage device, and an input device. The CPU, controlled by instructions received from the memory 13 and an operator through the input device, executes traversal pattern mining functions. The storage device stores multiple web log records and minimum support records. The memory comprises a traversal pattern mining program, and the traversal pattern mining program comprises a mining algorithm, a preparation function, a "SeqGen$_{C2}$" function and a "SeqGen$_{Ck}$" function.

The mining algorithm, the kernel of the traversal pattern mining program, includes routines executing preparation, SeqGen$_{C2}$ and SeqGen$_{Ck}$ functions to generate frequent reference sequences representing frequent traversal patterns. If min_sup(p) denotes a minimum support value of page p, the minimum support value of a reference sequence c, denoted by MinSup(c), is the lowest min_sup value among the pages in the reference sequence c, then $$MinSup(c) = \min_{p \in c}\{\min\_sup(p)\}.$$

In order to produce the seeds for generating candidate 2-reference sequences $C_2$, the algorithm first performs the preparation function with two arguments P and D, where P is the set of pages to be sorted in ascending order of their minimum support values, and D is the web log records. Frequent web path traversal patterns are generated by multiple scans of the web log records. The large k-reference sequences $L_k$ found in the $(k-1)^{th}$ scan are used to generate the candidate k-reference sequences $C_k$ using the SeqGen$_{Ck}$ function, except when k=2, for which the candidate generation function is SeqGen$_{C2}$. Next, the web log records are scanned and the support value of reference sequences in $C_k$ is calculated. Finally, new large k-reference sequences $L_k$ are obtained by removing those sequences whose support values are smaller than the corresponding values of MinSup(.). Finally, a resulting $L_k$ represents the frequent traversal patterns.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
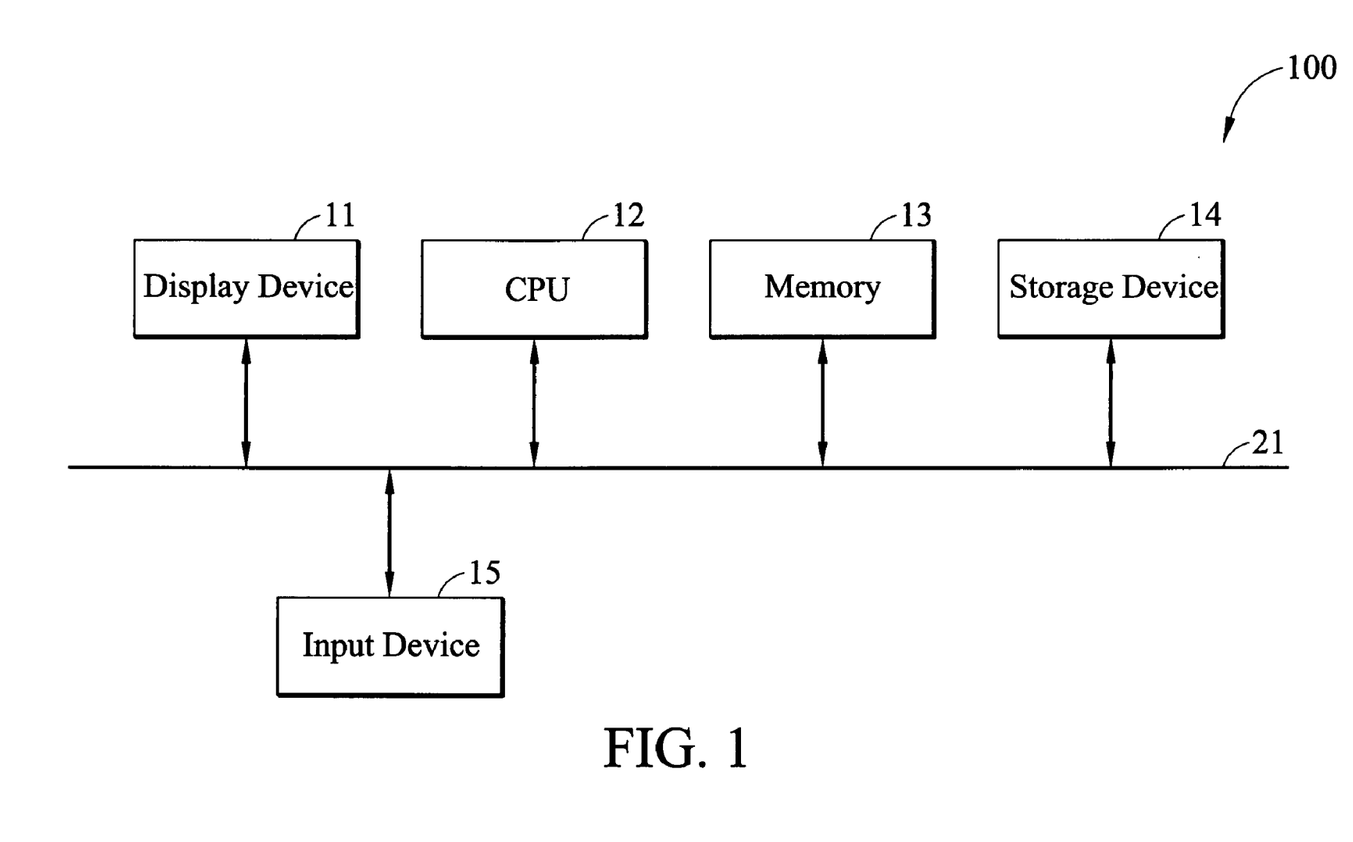
FIG. 1 is a diagram of the architecture of an apparatus of traversal pattern mining according to the invention.

FIG. 1 is a diagram of the architecture of an apparatus of traversal pattern mining according to the invention. The apparatus 100 includes a display device 11, a central processing unit (CPU) 12, a memory 13, a storage device 14, and an input device 15. The CPU 12 may be manufactured by MOTOROLA, IBM, or INTEL, the display device 11 can be a CRT, TFT-LCD, or plasma screen, and the input device 15 can be a keyboard, mouse, bar code reader, or others. The CPU 12 is connected by buses 21 to the display device 11, memory 13, storage device 14 and input device 15 based on Von Neumann architecture. The CPU 12, memory 13, storage device 14, display device 11 and input device 15 may be conventionally coupled to a mainframe computer, a minicomputer, a workstation computer, a personal computer, or a mobile computer. The CPU 12, controlled by instructions received from the memory 13 and an operator through the input device 15, executes traversal pattern mining functions.

Figure 2:
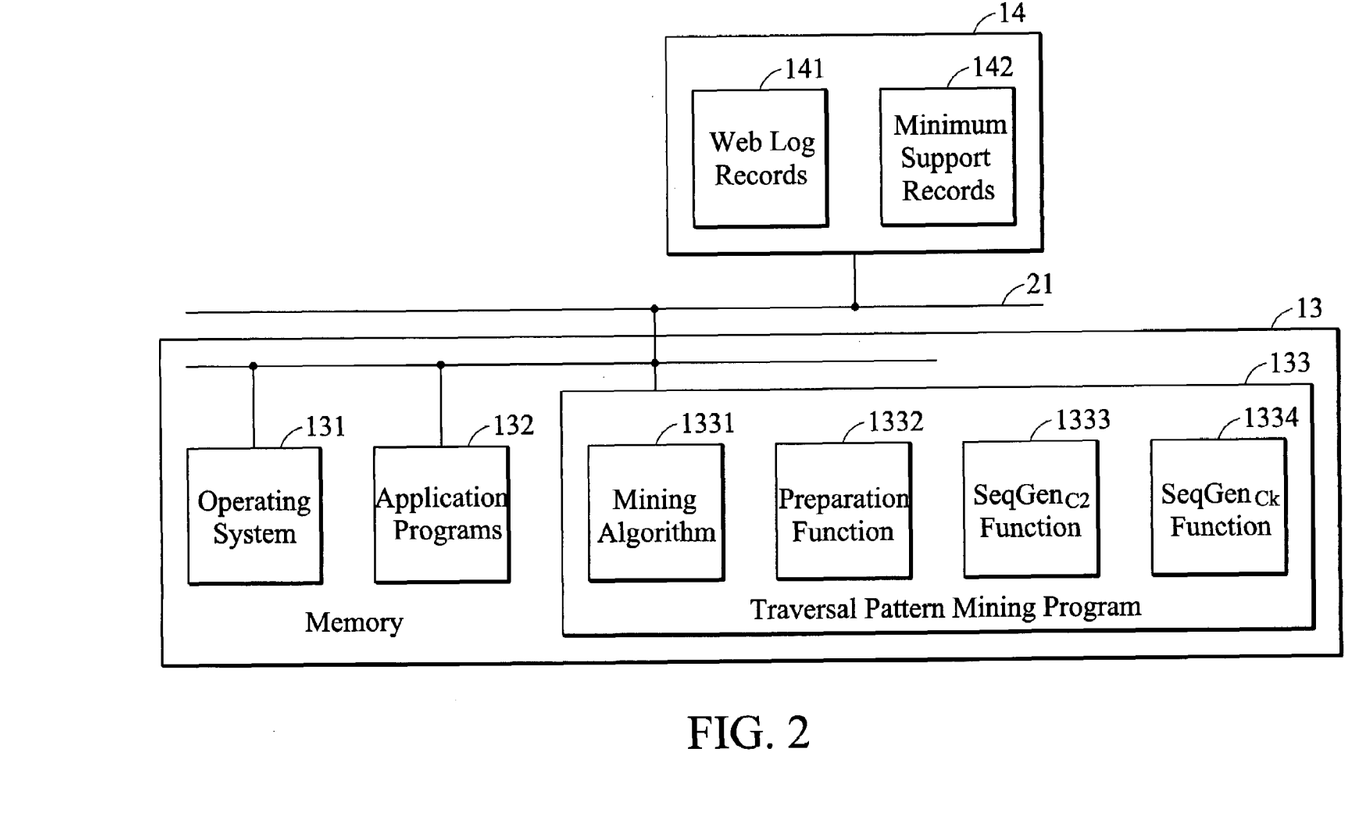
FIG. 2 is a diagram of the storage device and memory for the traversal pattern mining apparatus according to the invention.

FIG. 2 is a diagram of the storage device and memory for the traversal pattern mining apparatus according to the invention. The storage device 14 can be implemented in a relational database, object database, or file system, and stores multiple web log records 141 and minimum support records 142. The implementation of the web log records 141 or minimum support records 142 described is not limited to a single table, but also to multiple related tables. The memory 13 is preferably a random access memory (RAM), but may also comprise read-only memory (ROM) or flash ROM. The memory 13 comprises a traversal pattern mining program 133, and the traversal pattern mining program 133 comprises a mining algorithm 1331, a preparation function 1332, a "SeqGen$_{C2}$" function 1333 and a "SeqGen$_{Ck}$" function 1334. The traversal pattern mining program 133 inputs the web log records 141 and minimum support records 142, and accordingly generates frequent reference sequences. The present invention preferably uses a conventional operating system 131 such as MICROSOFT WINDOWS, UNIX, LINUX, SUN SOLARIS, IBM AIX, or others. The memory 13 may also comprise various application programs 132 including but not limited to computer drawing programs, word processing programs, and spreadsheet programs.

Figure 3:
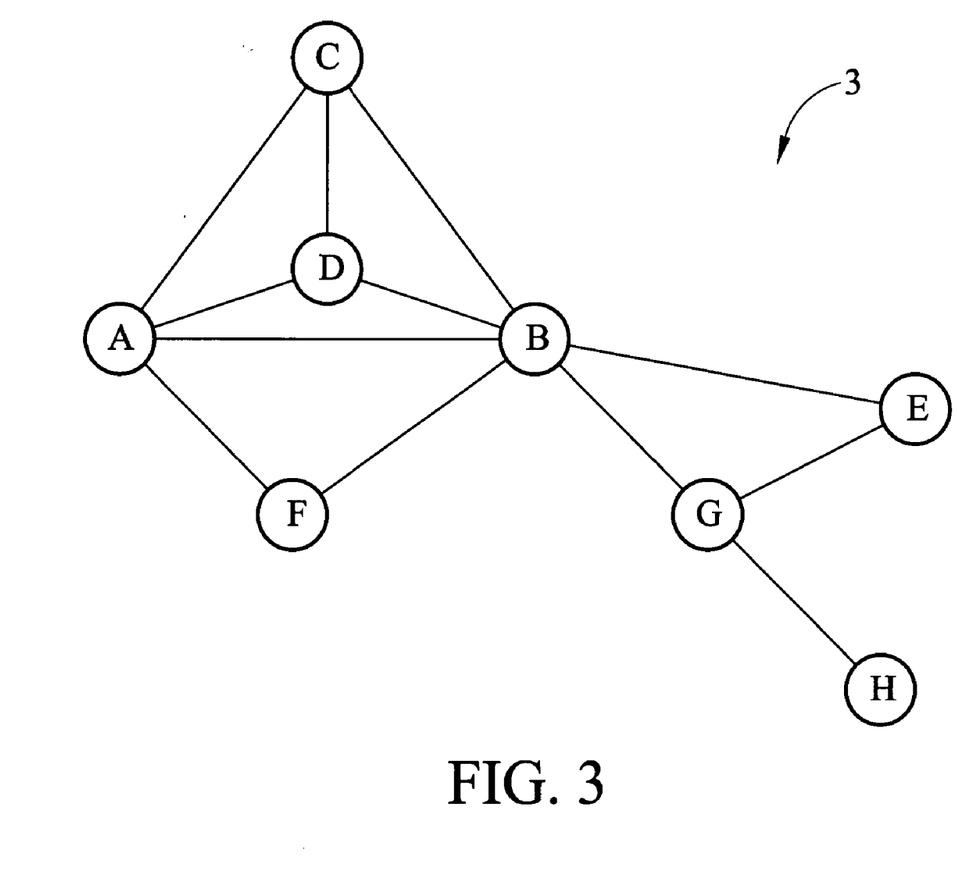
FIG. 3 is a diagram of an exemplary web page structure according to the present invention.
Figure 4:
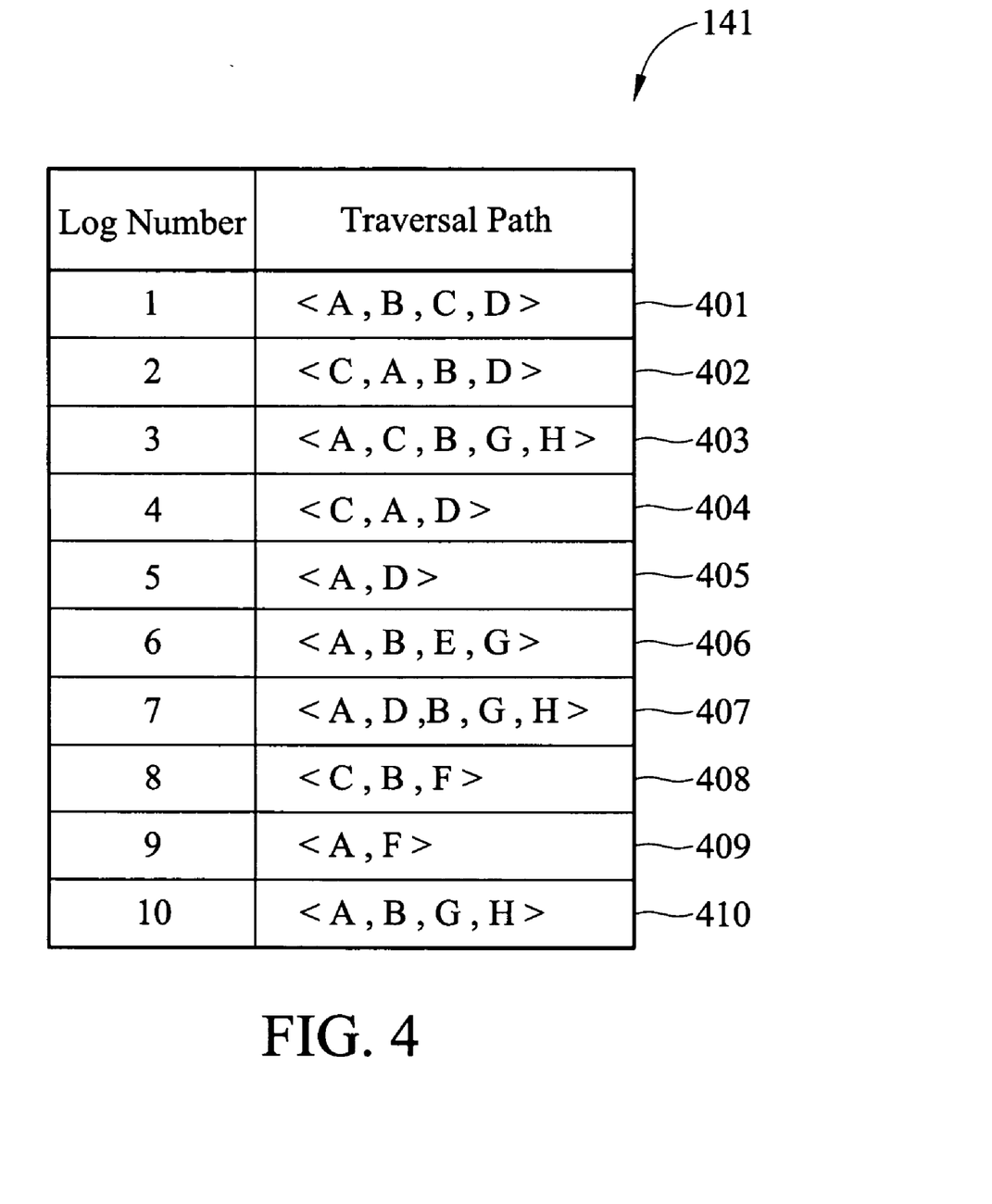
FIG. 4 shows exemplary web log records containing ten records according to the present invention.
Figure 5:
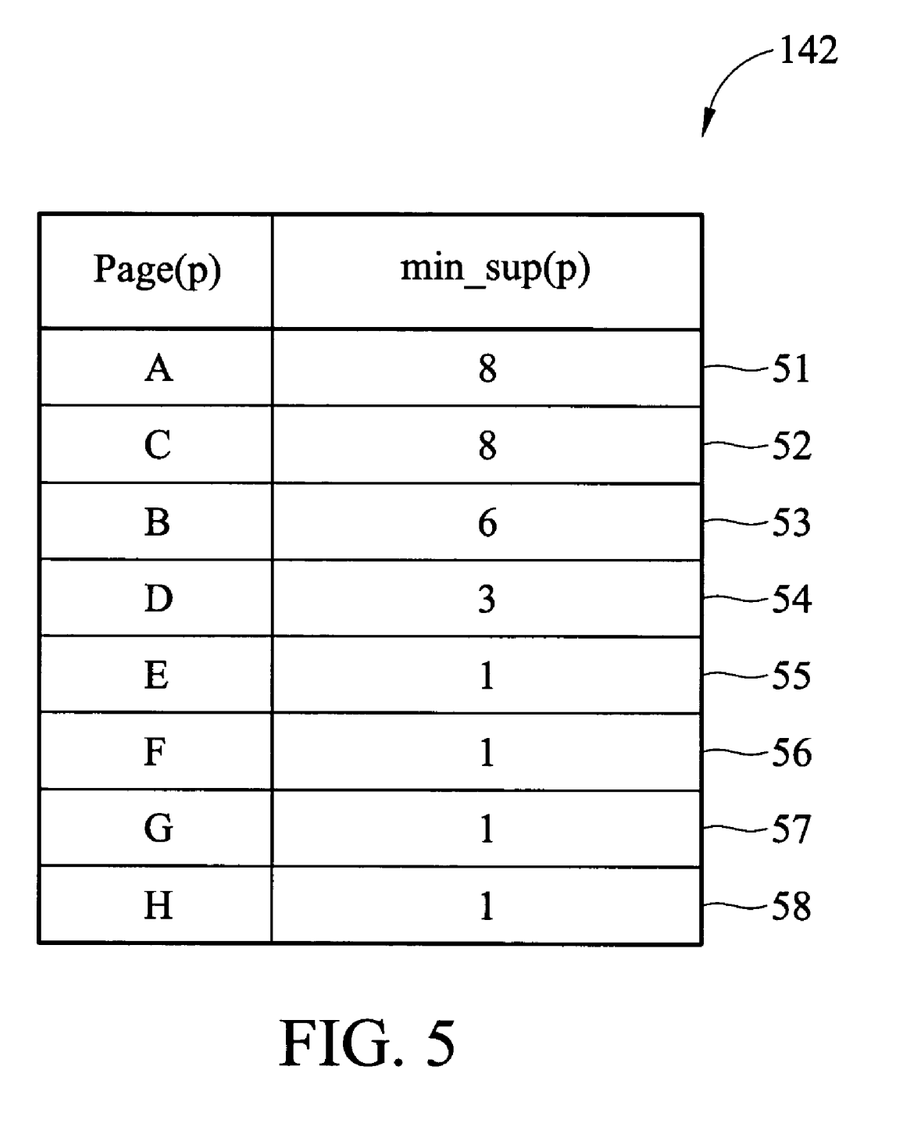
FIG. 5 shows exemplary minimum support records according to the present invention.

FIG. 3 is a diagram of an exemplary web page structure according to the present invention. The web page structure 3 contains pages A to H, showing the connectivity among web pages. FIG. 4 shows exemplary web log records containing ten records, ranging from 401 to 410, according to the present invention. The web log record 141 comprises two fields, such as log number and traversal path, the traversal path corresponding to the web page structure 3. For example, record 408 indicates that pages C, B and F are sequentially accessed. FIG. 5 shows exemplary minimum support records according to the present invention. The minimum support record stores a minimum support (min_sup) value of the web page, and the value is set according to the position of the web page. Pages with higher position, such as portal pages, are preferably configured with higher minimum support value.

The mining algorithm 1331, the kernel of the traversal pattern mining program 133, includes routines executing the preparation function 1332, SeqGen$_{C2}$ function 1333 and SeqGen$_{Ck}$ function 1334 to generate frequent reference sequences representing frequent traversal patterns. Referring to FIG. 5, min_sup(p) denotes a minimum support value of page p. The minimum support value of a reference sequence c, denoted by MinSup(c), is the lowest min_sup value among the pages in the reference sequence c, such that $$MinSup(c) = \min_{p \in c}\{min\_sup(p)\}.$$

The mining algorithm 1331 composed of pseudo-codes utilizes the following code sequence:

| Algorithm mining(P, D) |
| --- |
| (a1) SD=Preparation(P,D); |
| (a2) L1={<s>\|s∈SD,s.count≧min_sup(s)}; |

| Algorithm mining(P, D) |
| --- |
| -continued |
| (a3) for (k=2;L$_{k-1}$≠0;k++) do begin |
| (a4)     if (k=2) then C$_2$=SeqGen$_{C2}$(SD); |
| (a5)     else C$_k$=SeqGen$_{Ck}$(L$_{k-1}$); |
| (a6)     end |
| (a7)     Scan database and compute frequency of each candidate C$_k$; |
| (a8)     L$_k$={c∈C$_k$\|c.count≧MinSup(c)}; |
| (a9) end |

(a10) Answer=∪$_k$L$_k$;

In order to produce the seeds for generating candidate 2-reference sequences C$_2$, the algorithm first performs the preparation function 1332 with two arguments P and D, where P is the set of pages to be sorted in ascending order of their minimum support values, as shown in FIG. 5, and D the web log records as shown in FIG. 4. Details of the preparation function 1332 are further described as follows. Frequent web path traversal patterns are generated using multiple scans of the web log records 141. The large k-reference sequences L$_k$ found in the (k−1)$^{th}$ scan are used to generate the candidate k-reference sequences C$_k$ using the SeqGen$_{Ck}$ function 1334, except when k=2, for which the candidate generation function is SeqGen$_{C2}$ 1333, as stated in step a4 and step a5 of the mining algorithm 1332. Next, the web log records 141 are scanned and the support value of reference sequences in C$_k$ is calculated as stated in step a7. Finally, new large reference sequences are obtained by removing those sequences whose support values are smaller than their corresponding values of MinSup(.), as stated in step a8. Details of both the SeqGen$_{C2}$ function 1333 and SeqGen$_{Ck}$ function 1334 are further described as follows.

The preparation function 1332 is devised to produce not only L$_1$ but also the seed for C$_2$ generation. With the input of two arguments P and D, the preparation function 1332 composed of pseudo-codes utilizes the following code sequence:

| Function Preparation(P, D) |
| --- |
| (b1) Scan database and compute frequency of each page p∈P; |
| (b2) Sort pages in P in ascending order of their minimum support; |
| (b3) Following sorted order, find first page f in P that frequency of f exceeds min_sup(f); |
| (b4) Insert page f into seed set SD; |
| (b5) for each subsequent page i in P that is ordered after f |
| (b6)     if (i.count≧min_sup(f)) |
| (b7)         insert i into set SD; |
| (b8) end |

Figure 6A:
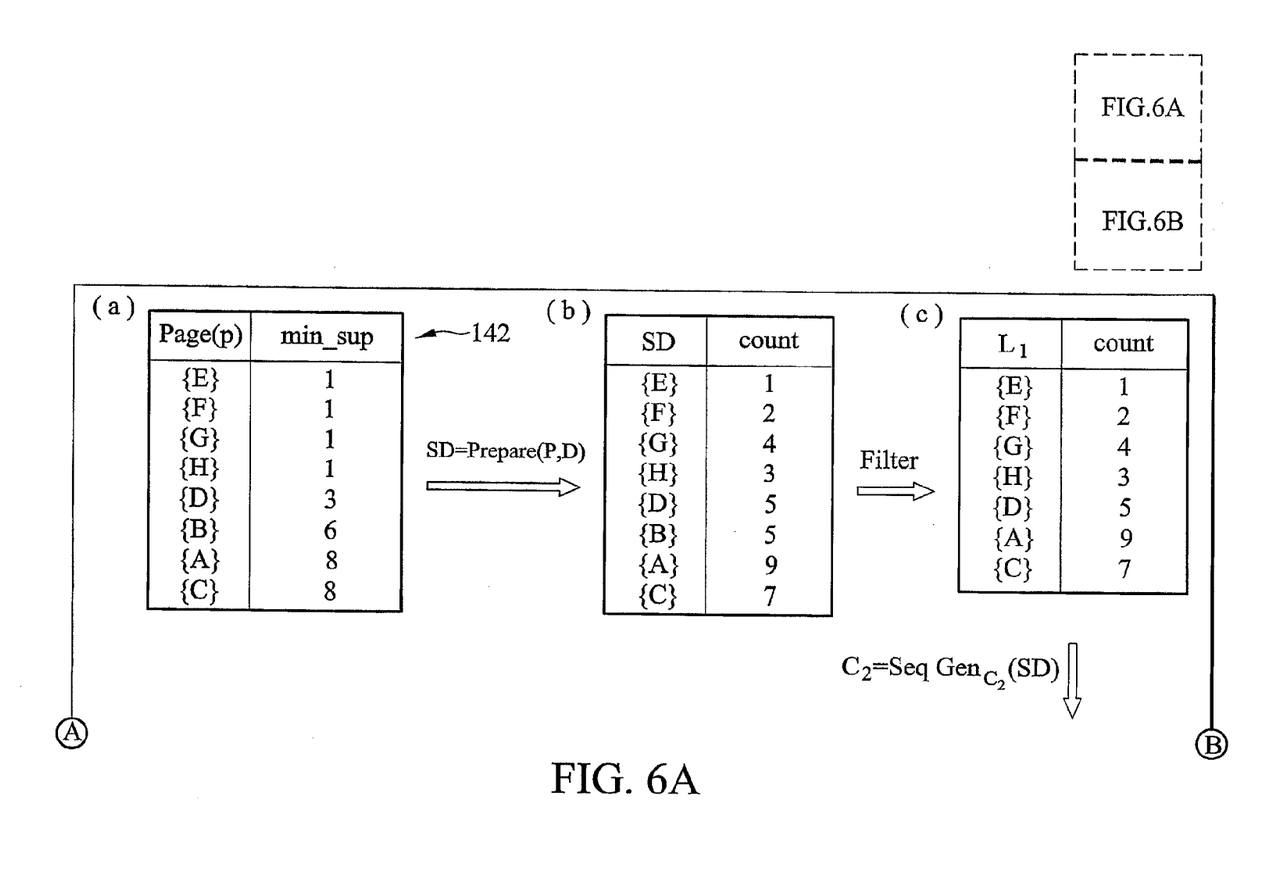
FIG. 6 shows exemplary large 1-reference sequences $L_1$ and large 2-reference sequences $L_2$ according to the present invention.
Figure 6B:
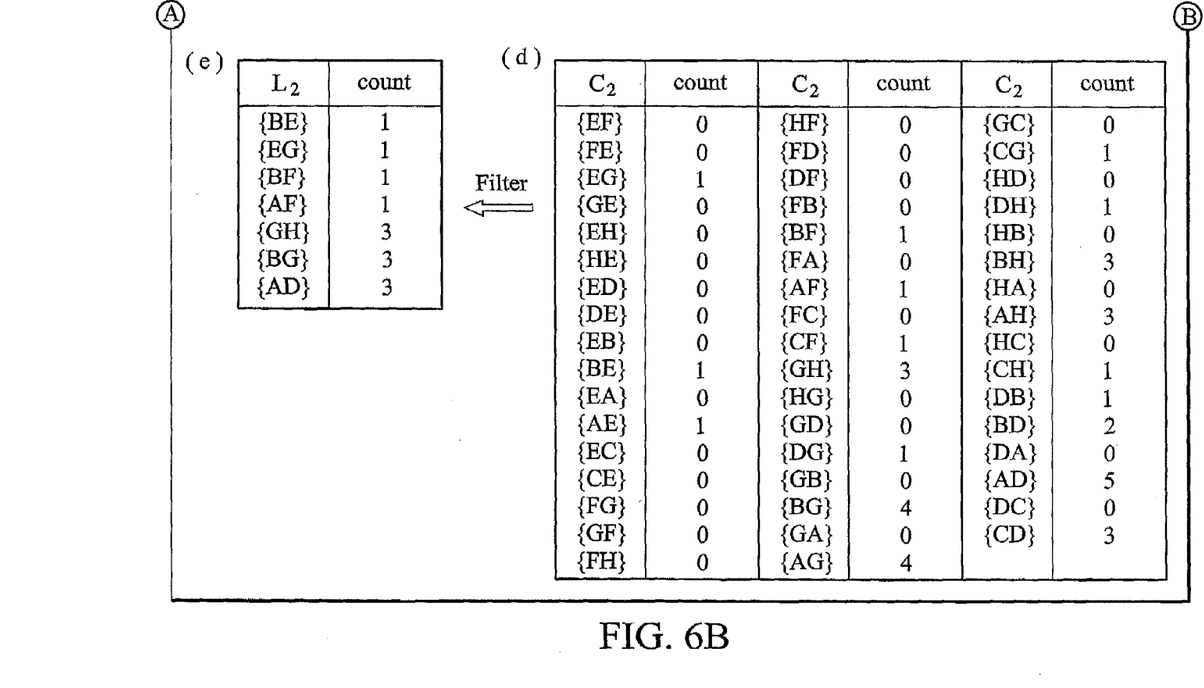

Consider the web page structure as shown in FIG. 3. The web log records 141 and the support threshold of each web page are provided in FIG. 4 and FIG. 5, respectively. FIG. 6 shows exemplary large 1-reference sequences L$_1$ and large 2-reference sequences L$_2$ according to the present invention. After one pass of the web log records 141, the occurrence (i.e., count) of each seed (SD) as shown in FIG. 6b is calculated as stated in step b1. As a result, the SD set and L$_1$ as shown in FIG. 6b and FIG. 6c respectively are obtained as stated in steps b3 to b8. It is noted that page B is not in L$_1$ because B.count is smaller than the value of min_sup(B).

In the SeqGen$_{C2}$ function 1333, argument SD as shown in FIG. 6b is employed to generate $C_2$ and utilizes the following code sequence:

```
                Function SeqGen_C2 (SD)

(c1) for each p in SD in the same order do begin
(c2)    if p.count≧min_sup(p) then
(c3)       for each q is ordered after p in SD do
begin
(c4)          if q.count≧min_sup(p) then
(c5)             insert {pq} and {qp} into C_2;
(c6)       end
(c7) end
```

As a result, the $C_2$ as shown in FIG. 6d is obtained as stated in steps c1 to c7. {BA}, {AB}, {BC} and {CB} are not in $C_2$ because B.count is smaller than the min_sup(B). Hence, {BA}, {AB}, {BC} and {CB} are not frequent. It is noted that a web page p∉$L_1$ does not imply that its corresponding occurrence does not exceed that of the min_sup of an earlier page in the sorted order. For example, the page B is in SD but not in $L_1$. If the SeqGen$_{C2}$ function 1333 uses $L_1$ to generate $C_2$, candidate reference sequence such as {BD} is missed, the reason for use of the SD set, other than $L_1$ in the SeqGen$_{C2}$ function 1333.

Figure 7:
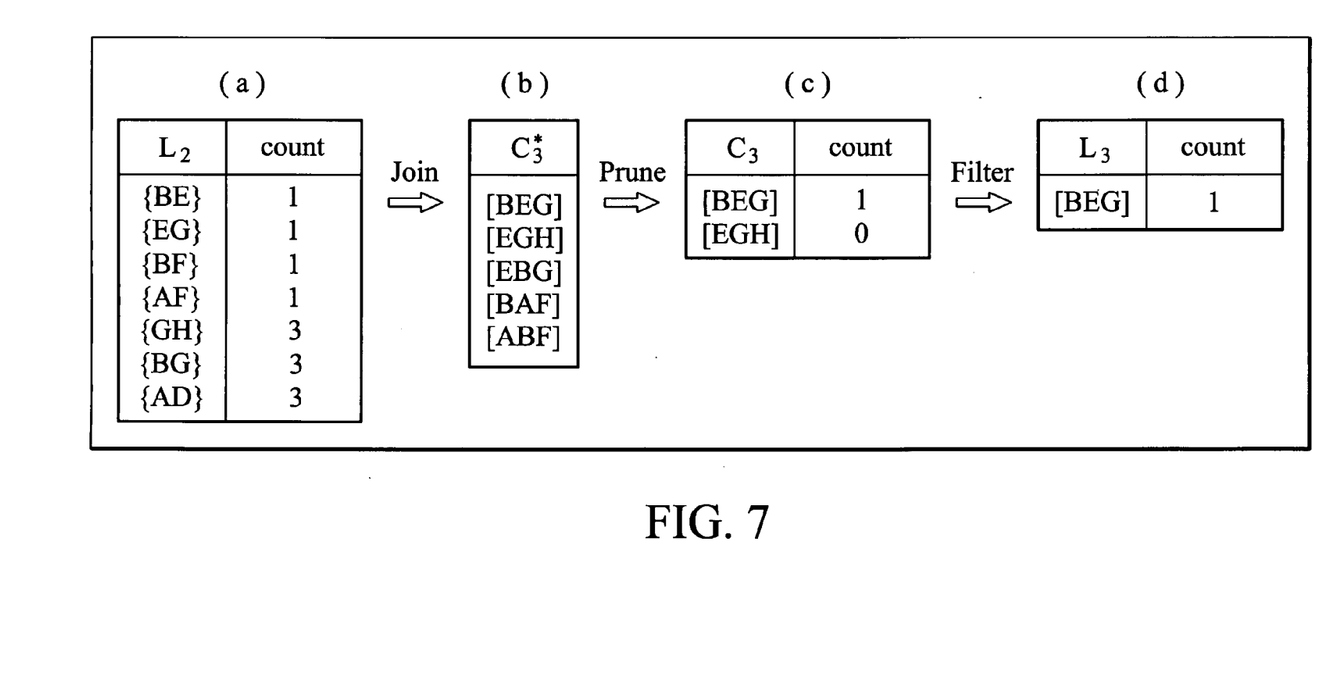
FIG. 7 shows exemplary large 3-reference sequences $L_3$ according to the present invention.

FIG. 7 shows exemplary large 3-reference sequences $L_3$ according to the present invention. In the SeqGen$_{Ck}$ function 1334, argument $L_{k-1}$ is employed to generate $C_k$ and utilizes the following code sequence:

```
              Function SeqGen_Ck (L_{k-1})

(d1) insert into C_k //join L_{k-1} with L_{k-1}
(d2) select p_1,p_2,...,p_{k-1},q_{k-1} from p,q∈L_{k-1} where //mid_join
     p_2=q_1,...,p_{k-1}=q_{k-2} and p_1∉MSP(p) and q_{k-1}∉MSP(q)
(d3) Union
(d4) select p_1,p_2,...,p_{k-1},q_{k-1} from p,q∈L_{k-1} where //head_join
     p_1=q_1,...,p_{k-2}=q_{k-2} and p_1∈MSP(p) and q_1∈MSP(q)
(d5) Union
(d6) select p_1,q_1,q_2,..., q_{k-1} from p,q∈L_{k-1} where //tail_join
     p_2=q_2,...,p_{k-1}=q_{k-1} and p_{k-1}∈MSP(P) and q_{k-1}∈MSP(q);
(d7) for each reference sequence c∈C_k do begin
(d8)    for each k-1 subsets s of c do begin
(d9)       if |MSP(c)|≧2 or MinSup(s)=MinSup(c) then
(d10)         if (s∉L_{k-1}) then
(d11)            delete c from C_k;
(d12)   end
(d13) end
```

The SeqGen$_{Ck}$ function 1334 first inputs $L_{k-1}$ and joins $L_{k-1}$ with $L_{k-1}$ to generate temporal candidate k-reference sequence $c^*_k$ using three joinable forms, such as "head_join", "mid_join" and "tail_join", as stated in steps d1 to d6.

The minimal support page of a reference sequence r is MSP(r)={p|p∈r,min_sup(p)=MinSup(r)}, referring to FIG. 7b, MSP({BEG})={E}. Let p and q are (k-1)-reference sequences which contain $p_1, \ldots, p_{k-1}$ and $q_1, \ldots, q_{k-1}$ respectively. If p excluding $p_1$ is equal to q excluding $q_{k-1}$, $p_1$ is not MSP(p) and $q_{k-1}$ is not MSP(q), then $c^*_k=\{p_1, p_2 \ldots, p_{k-1}, q_{k-1}\}$ is obtained using the mid_join form as stated in step d2. If p excluding $p_{k-1}$ is equal to q excluding $q_{k-1}$, $p_1$ is MSP(p) and $q_1$ is MSP(q), then $c^*_k=\{p_1, p_2 \ldots, p_{k-1}, q_{k-1}\}$ is obtained using the head_join form as stated in step d4. If p excluding $p_1$ is equal to q excluding $q_1$, $p_{k-1}$ is MSP(p) and $q_{k-1}$ is MSP(q), then $c^*_k=\{p_1, q_1, q_2, \ldots, q_{k-1}\}$ is obtained using the tail_join form as stated in step d6. The SeqGen$_{Ck}$ function 1334 deletes all sets of reference sequences c∈$C_k$ which are infrequent, as stated in steps d7 to d13.

The SeqGen$_{Ck}$ function 1334 inputs $L_2$ as shown in FIG. 7a, joins $L_2$ with $L_2$ to generate temporary candidate 3-reference sequence $c^*_3$ as shown in FIG. 7b using the above joinable forms. For example, {BEG} is generated from {BE} and {EG} using mid_join form; {EBG} is generated from {BG} and {EG} using tail_join form; and {BAF} is generated from {BF} and {AF} using head_join form. Candidate 3-reference sequence $C_3$ excluding {EBG}, {BAF} and {ABF} as shown in FIG. 7c is generated.

Finally, the mining algorithm 1331 acquires frequent reference sequence sets including $L_1$, $L_2$ and $L_3$ as shown in FIGS. 6c, 6e and 7d respectively, as stated in step a10.

Figure 8:
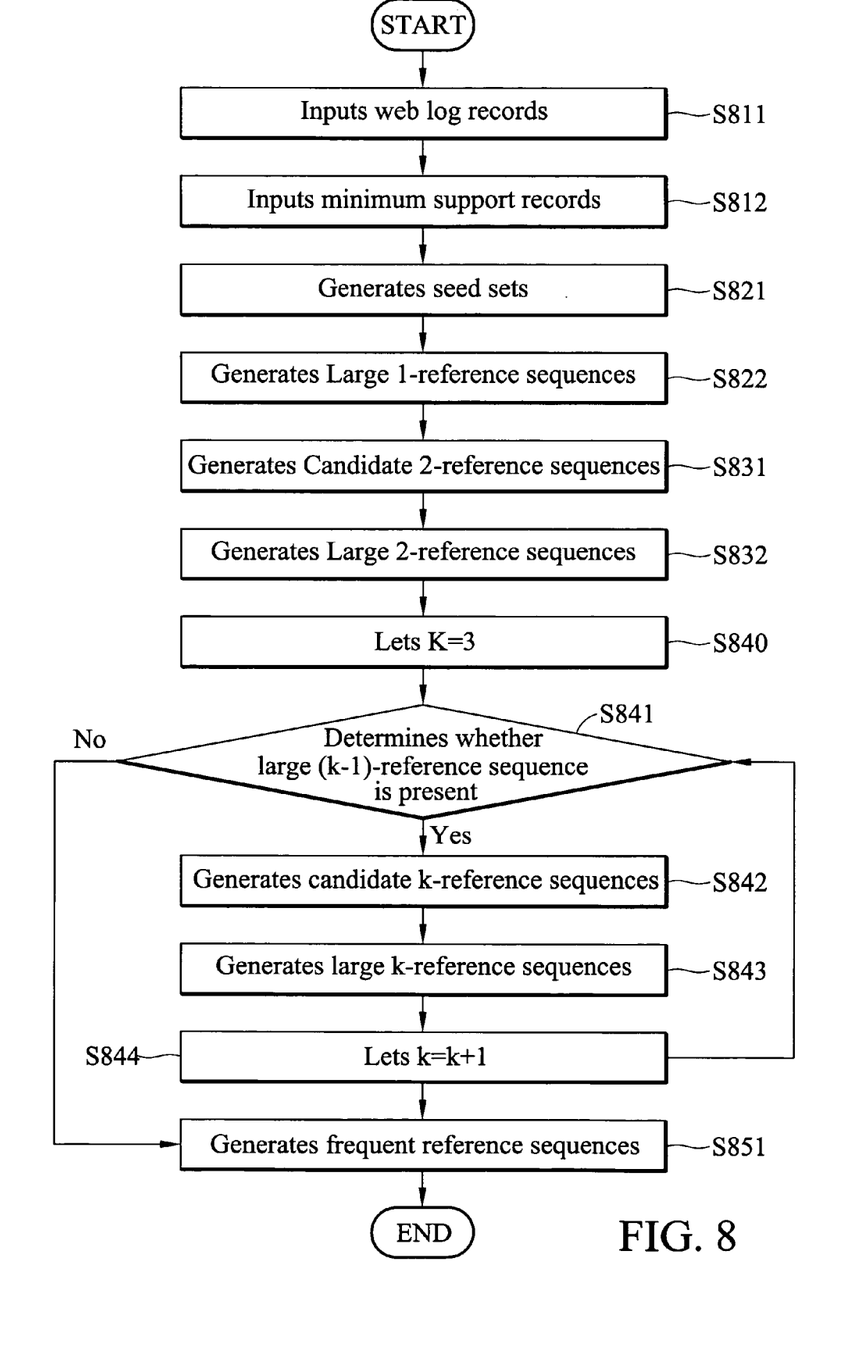
FIG. 8 is a flowchart showing the method of the traversal pattern mining according to the invention.

FIG. 8 is a flowchart showing a method of the traversal pattern mining according to the invention. The process begins in steps S811 and S812, respectively inputs web log records 141 as shown in FIG. 4, and minimum support records 142 as shown in FIG. 5. The web log record 141 comprises two fields, such as log number and traversal path, the traversal path corresponding to the web page structure 3. The minimum support record stores a min_sup value of the web page, and the value is set according to the position of the web page.

Then, in step S821, after one pass of the web log records 141, the occurrence (i.e., count) of each seed (SD) as shown in FIG. 6b is calculated, and the SD set is arranged in ascending order of their minimum support. In step S822, the $L_1$ as shown in FIG. 6c is generated by removing pages whose occurrence is less than that of corresponding min_sup in SD set.

In step S831, wherein each page q is ordered after page p in SD, it is determined whether occurrence of q is greater than or equal min_sup(p), if so, {pq} and {qp} are inserted into $C_2$. The resulting $C_2$ is shown in FIG. 6d. Step S832 calculates each sequence occurrence in $C_2$ by scanning web log records 141 and inserts sequences whose occurrence exceeds or equals corresponding MinSup(.) into $L_2$. The resulting $L_2$ is shown in FIG. 6e.

In step S840, k is set to 3. The process proceeds to step S842 because $L_2$ is present. In step 842, $L_2$ is joined with $L_2$ to generate $c^*_3$ using the above joinable forms. The resulting $c^*_3$ is shown in FIG. 7b. Next, $C_3$ as shown in FIG. 7c is generated by deleting all reference sequences c∈$c^*_3$ comprising invalid traversal paths according to the web page structure 3. Step S843 calculates each sequence occurrence in $C_3$ by scanning web log records 141 and inserts sequences whose occurrence exceeds or equals MinSup(sequence) into $L_3$. The resulting $L_3$ is shown in FIG. 7d. Step S844 adds 1 to k.

Finally, the process proceeds to step S851 to acquire frequent reference sequence sets including $L_1$, $L_2$ and $L_3$ as shown in FIGS. 6c, 6e and 7d respectively.

The system and method of traversal pattern mining of the present invention considers the length of the pattern and the positions of web pages, with reduced process time and improved result usability.

Although web pages are used in the embodiment, the present invention is also applicable to images, sounds, videos, files or others, linked by web pages.

Figure 9:
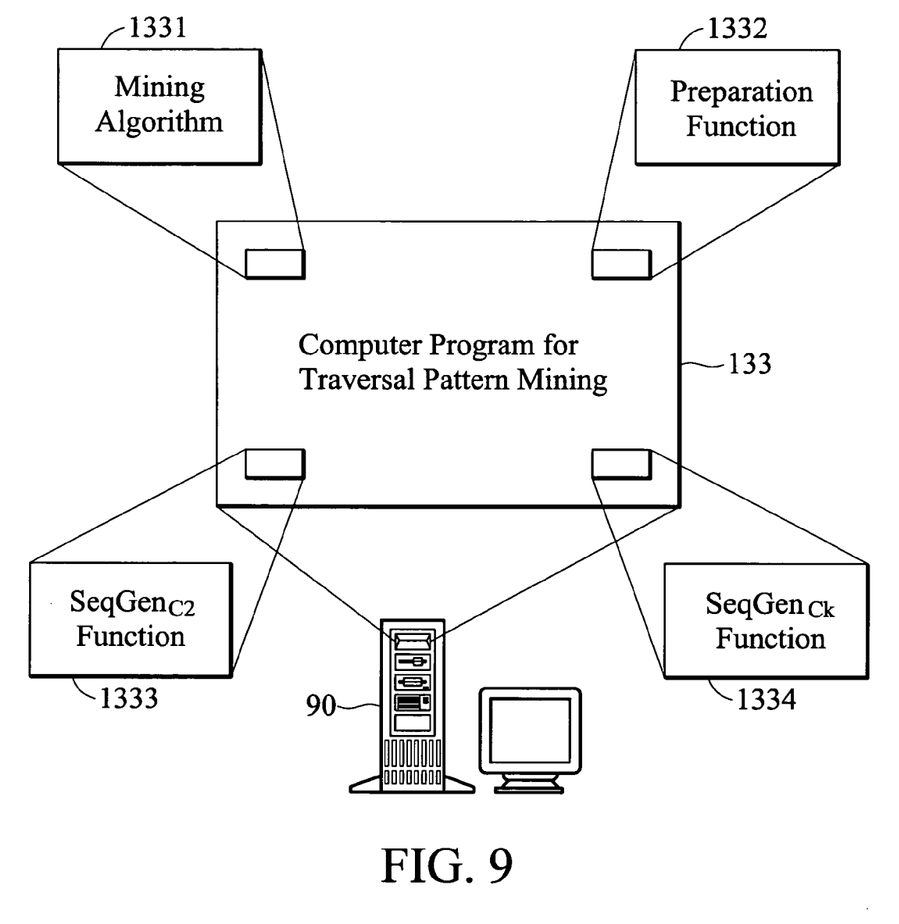
FIG. 9 is a diagram of a storage medium storing a computer program providing the method of the traversal pattern mining according to the invention.

The invention additionally discloses a storage medium for storing a computer program 133 providing the disclosed method of traversal pattern mining, as shown in FIG. 9. The computer program product includes a storage medium 60 having computer readable program code embodied in the medium for use in a computer system, the computer readable program code comprising at least mining algorithm 1331, preparation function 1332, SeqGen$_{C2}$ function 1333, and SeqGen$_{Ck}$ function 1334.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An apparatus for traversal pattern mining, comprising:
 a storage device storing a plurality of web log records and a plurality of minimum support (min_sup) records, each web log record comprising a plurality of ordered web objects, each min_sup record corresponding to the web object and comprising a min_sup value corresponding to the position of the web object; and
 a traversal pattern mining program, recorded in a computer readable medium and configured for a computer to perform the steps of:
 inputing the web log records and the min_sup records;
 calculating occurrence of the web object by scanning the web log records;
 inserting the web objects with occurrence exceeding or equaling the corresponding min_sup value into a first large reference sequence set (L1);
 generating a plurality of first candidate reference sequences individually comprising two web objects with occurrence exceeding zero;
 calculating occurrence of each first candidate reference sequence by scanning the web log records;
 inserting the first candidate reference sequences with occurrence exceeding or equaling the minimized min_sup value of the self-contained web objects into a second large reference sequence set (L2);
 generating a traversal pattern set by merging the (L1) and the (L2); and
 displaying a plurality of highly correlated web objects based on the traversal pattern.

2. The apparatus as claimed in claim 1 wherein the web object comprises a web page or an electronic file linked to by the web page.

3. The apparatus as claimed in claim 1 wherein the traversal pattern mining program further generates a plurality of second candidate reference sequences by self-joining the L2 using a joinable form, calculates occurrence of each second candidate reference sequence by scanning the web log records, inserts the second candidate reference sequences with occurrence exceeding or equaling the minimized min_sup value of the self-contained web objects into a third large reference sequence set L3, and inserts the L3 into the traversal pattern set.

4. The apparatus as claimed in claim 1 wherein the traversal pattern mining program further generates a plurality of new candidate reference sequences individually comprising more than two web objects by self-joining previously calculated large reference sequence set using a joinable form.

5. A method of traversal pattern mining for web design, the method comprising using a computer to perform the steps of:
 inputting a plurality of web log records and a plurality of minimum support (min_sup) records, each web log record comprising a plurality of ordered web objects, each min_sup record corresponding to the web object and comprising a min_sup value corresponding to the position of the web object;
 calculating occurrence of the web object by scanning the web log records;
 inserting the web objects with occurrence exceeding or equaling the corresponding min_sup value into a first large reference sequence set (L1);
 generating a plurality of first candidate reference sequences individually comprising two web objects with occurrence exceeding zero;
 calculating occurrence of each first candidate reference sequence by scanning the web log records;
 inserting the first candidate reference sequences with occurrence exceeding or equaling to the minimized min_sup value of the self-contained web objects into a second large reference sequence set (L2);
 generating a traversal pattern set by merging the (L1) and the (L2); and
 displaying a plurality of highly correlated web objects based on the traversal pattern set for web site design.

6. The method as claimed in claim 5 wherein the web object comprises a web page or an electronic file linked to by the web page.

7. The method as claimed in claim 5 further comprising the steps of:
 generating a plurality of second candidate reference sequences by self-joining the L2 using a joinable form;
 calculating occurrence of each second candidate reference sequence by scanning the web log records;
 inserting the second candidate reference sequences with occurrence exceeding or equaling to the minimized min_sup value of the self-contained web objects into a third large reference sequence set L3; and
 inserting the L3 into the traversal pattern set.

8. The method as claimed in claim 5 further comprising a step of generating a plurality of new candidate reference sequences individually comprising more than two web objects by self-joining previously calculated large reference sequence set using a joinable form.

9. A machine-readable storage device storing a computer program providing a method of traversal pattern mining, the method comprising using a computer to perform the steps of:
 inputting a plurality of web log records and a plurality of minimum support (min_sup) records, each web log record comprising a plurality of ordered web objects, each min_sup record corresponding to the web object and comprising a min_sup value corresponding to the position of the web object;

calculating occurrence of the web object by scanning the web log records;

insertion the web objects with occurrence exceeding or equaling to the corresponding min_sup value into a first large reference sequence set (L1);

generating a plurality of first candidate reference sequences individually comprising two web objects with occurrence exceeding zero;

calculating occurrence of each first candidate reference sequence by scanning the web log records;

inserting the first candidate reference sequences with occurrence exceeding or equaling the minimized min_sup value of the self-contained web objects into a second large reference sequence set (L2);

generating a traversal pattern set by merging the (L1) and the (L2); and displacing a plurality of highly correlated web objects based on the traversal pattern.

10. The machine-readable storage medium as claimed in claim 9 wherein the web object comprises a web page or an electronic file linked to by the web page.

11. The machine-readable storage medium as claimed in claim 9 wherein the method further comprises the steps of:

generating a plurality of second candidate reference sequences by self-joining the L2 using a joinable form;

calculating occurrence of each second candidate reference sequence by scanning the web log records;

inserting the second candidate reference sequences with occurrence exceeding or equaling the minimized min_sup value of the self-contained web objects into a third large reference sequence set L3; and inserting the L3 into the traversal pattern set.

12. The machine-readable storage medium as claimed in claim 9 wherein the method further comprises a step of generating a plurality of new candidate reference sequences individually comprising more than two web objects by self-joining previously calculated large reference sequence set using a joinable form.

* * * * *